(12) United States Patent
Kragl

(10) Patent No.: US 6,813,418 B1
(45) Date of Patent: Nov. 2, 2004

(54) OPTOELECTRONIC ASSEMBLY, COMPONENTS FOR SAME AND METHOD FOR MAKING SAME

(75) Inventor: Hans Kragl, Diekholzen (DE)

(73) Assignee: Harting Elektro-optische Bauteile GmbH & Co. KG (DE)

( * ) Notice: Subject to any disclaimer, the term of this patent is extended or adjusted under 35 U.S.C. 154(b) by 113 days.

(21) Appl. No.: 10/030,847

(22) PCT Filed: Jul. 11, 2000

(86) PCT No.: PCT/EP00/06575

§ 371 (c)(1),
(2), (4) Date: Feb. 22, 2002

(87) PCT Pub. No.: WO01/04671

PCT Pub. Date: Jan. 18, 2001

(30) Foreign Application Priority Data

Jul. 12, 1999 (DE) .......................... 199 32 430

(51) Int. Cl.[7] ............................................... G02B 6/30
(52) U.S. Cl. ........................ 385/49; 385/88; 385/47; 385/39
(58) Field of Search ...................... 385/49, 31, 47, 385/39, 88

(56) References Cited

U.S. PATENT DOCUMENTS

| | | | |
|---|---|---|---|
| 4,410,394 A | 10/1983 | Stalcup et al. | 156/630 |
| 5,369,529 A | 11/1994 | Kuo et al. | 359/858 |
| 5,400,419 A | 3/1995 | Heinen | 385/14 |
| 5,475,775 A | 12/1995 | Kragl et al. | 385/14 |
| 5,479,540 A | 12/1995 | Boudreau et al. | 385/14 |
| 5,479,543 A | * 12/1995 | Black | 385/31 |
| 5,577,142 A | 11/1996 | Mueller-Fiedler et al. | 385/47 |
| 5,774,609 A | 6/1998 | Backlin et al. | 385/49 |
| 6,402,394 B1 | * 6/2002 | Heinrich et al. | 385/89 |
| 2002/0041731 A1 | * 4/2002 | Fujita et al. | 385/31 |
| 2002/0159692 A1 | * 10/2002 | Whitehead | 385/31 |

FOREIGN PATENT DOCUMENTS

| | | | |
|---|---|---|---|
| DE | 3929794 A1 | 4/1991 | |
| EP | 0826995 A1 | 3/1998 | |
| WO | WO 98/50809 | 11/1998 | |
| WO | WO 9924855 A1 | * 5/1999 | G02B/6/42 |

OTHER PUBLICATIONS

Bruel, M. et al. "Smart–Cut: A New Silicon on Insulator Material Technology Based on Hydrogen Implantation and Wafer Bonding" Japanese Journal of Applied Physics, JP, Publication Office Japanese Journal of Applied Physics. Tokyo, Bd. 36, Nr. 3B, Part 01, Mar. 1, 1997, pp. 1636–1641.

* cited by examiner

Primary Examiner—Rodney Bovernick
Assistant Examiner—Sung Pak
(74) Attorney, Agent, or Firm—Hayes Soloway P.C.

(57) ABSTRACT

The invention relates to a transmitter-receiver assembly by means of which light signals can be transformed into electric signals (receiver mode), or electric signals into light signals (transmitter mode). Said assembly comprises a component (10) comprising positioning configurations (16), an optical waveguide (17), a first mirror (14) and a second mirror (15), the two mirrors (14, 15) lying in prolongation of the optical waveguide (17), and the second mirror (15), as seen from the optical waveguide (17), lying behind the first mirror (14), as well as to a component (20) having adjustment configurations (23), an optical transmitter (29) and an optical receiver (25), the transmitter (29) and the receiver (25) being arranged next to one another.

13 Claims, 8 Drawing Sheets

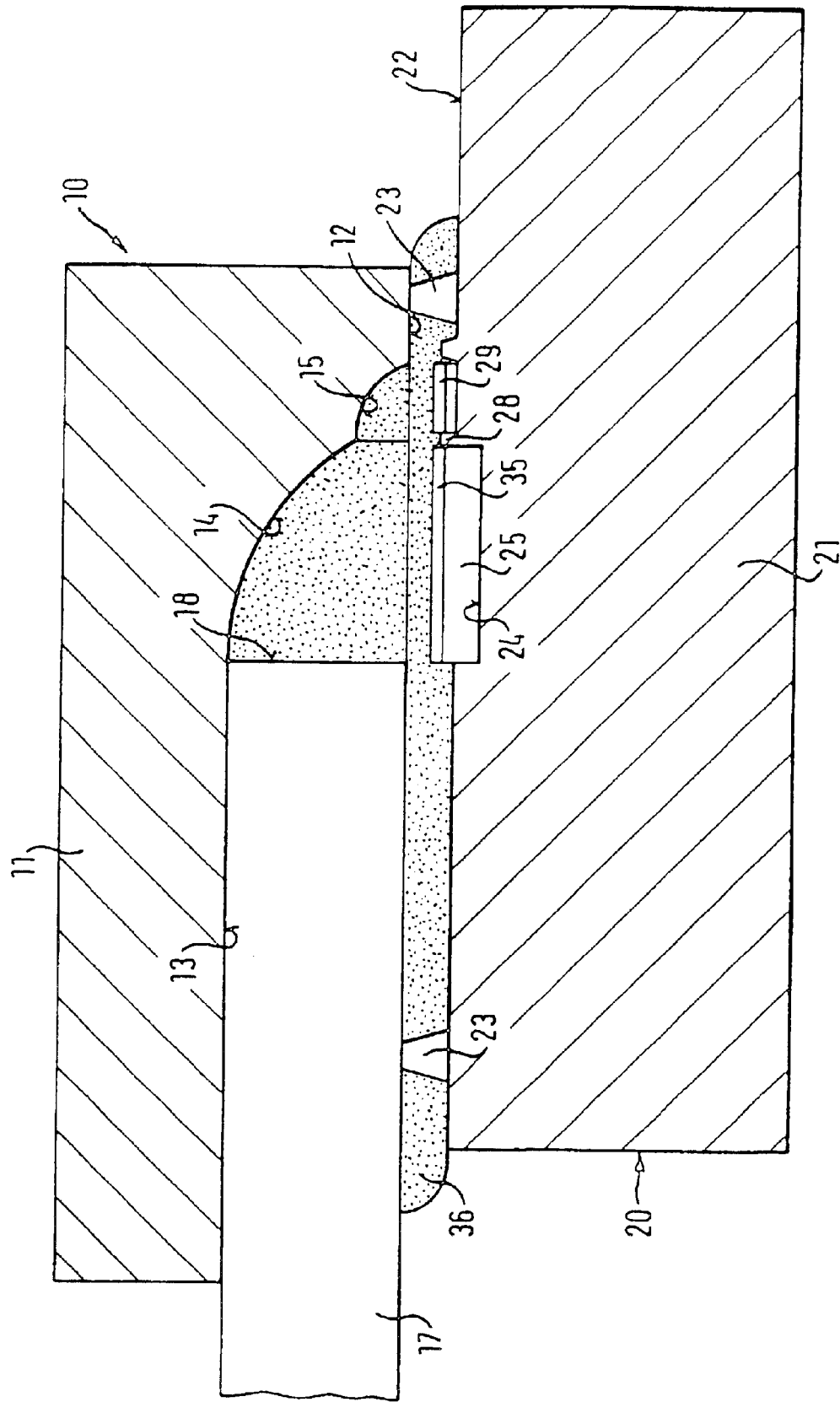

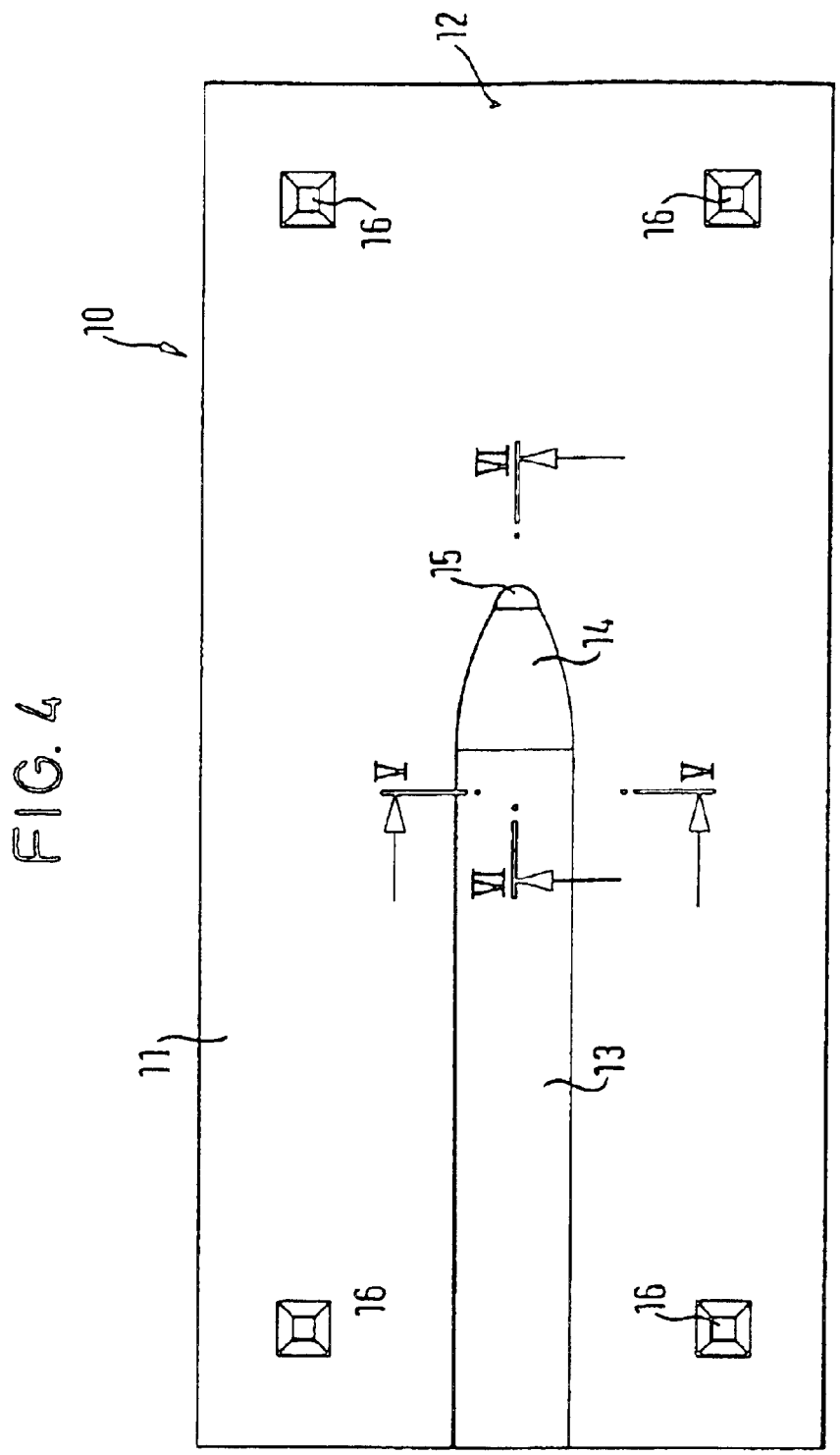

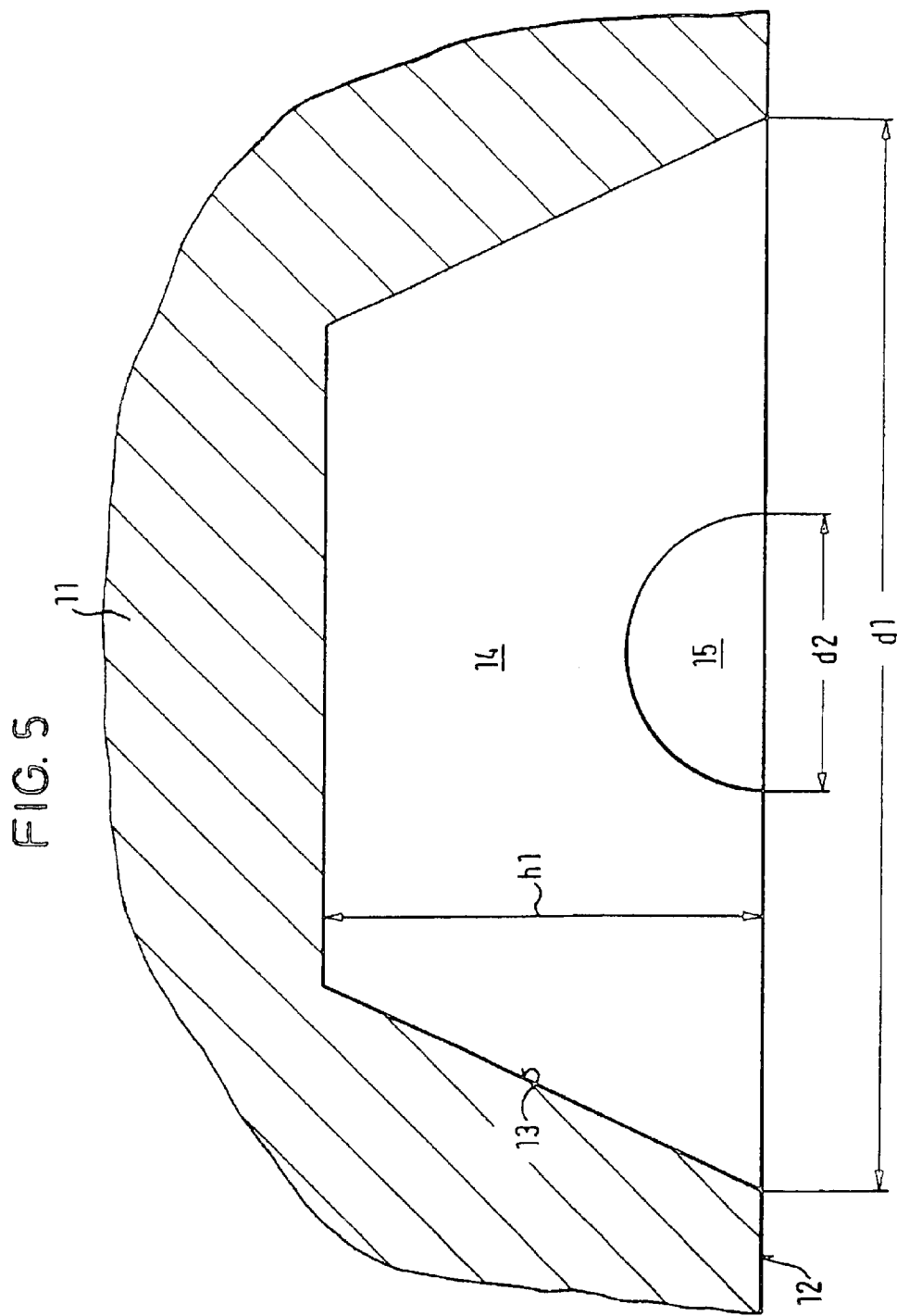

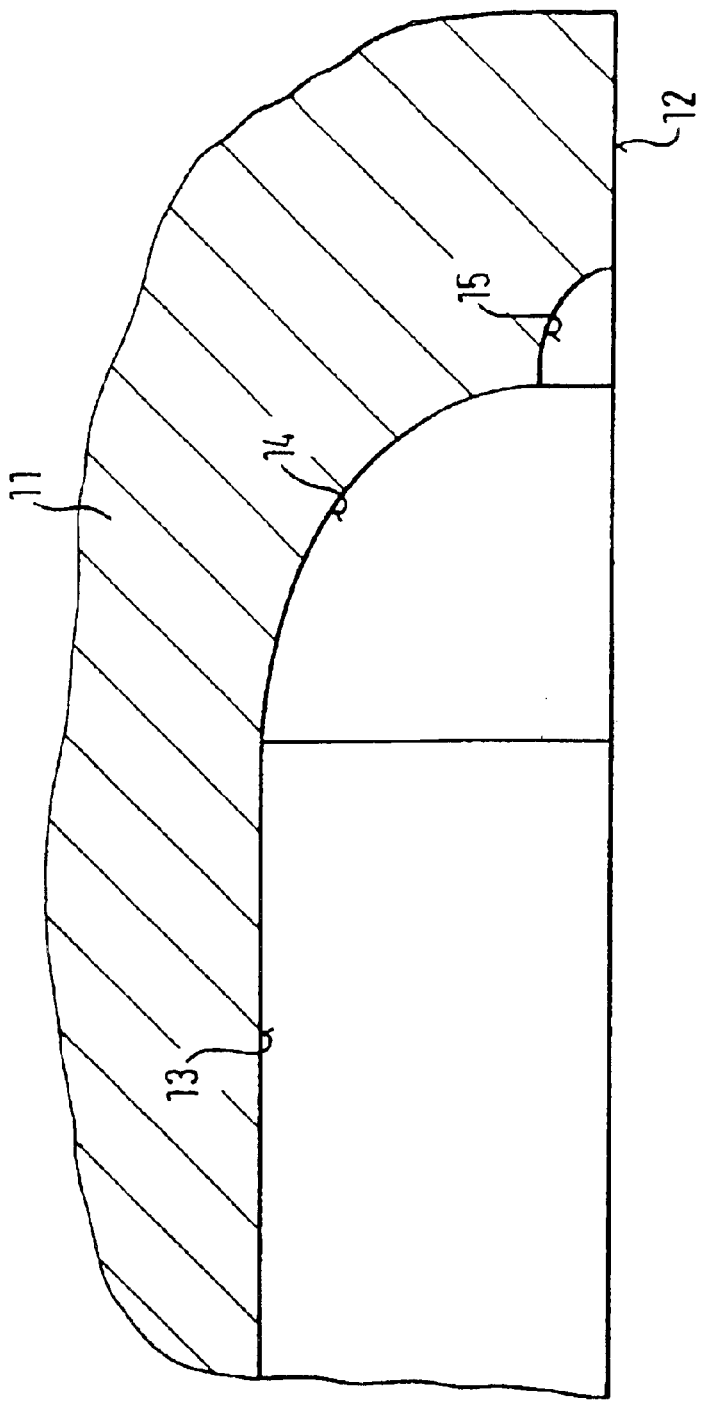

OPTOELECTRONIC ASSEMBLY, COMPONENTS FOR SAME AND METHOD FOR MAKING SAME

BACKGROUND OF THE INVENTION

The invention relates to an optoelectronic assembly, the components which make up this assembly, as well as to the method for making the assembly.

The assembly concerns a transmitter-receiver device, by means of which light signals can be transferred into electric signals (receiver mode), or electric signals into light signals (transmitter mode).

OBJECTS OF THE INVENTION

The object of the invention is to provide such an assembly which works with high efficiency both in the transmitter and the receiver mode and which can be produced with low expenditure. It is also the object of the invention to provide the individual components for such an assembly, which can be produced at low cost in large numbers and with high precision.

SUMMARY OF THE INVENTION

This object is solved by an assembly which consists of two separate components. One of the components comprises positioning configurations, an optical waveguide, a first mirror and a second mirror, the two mirrors lying in prolongation of the optical waveguide and the second mirror, as seen from the optical waveguide, lying behind the first mirror. The second component comprises adjustment configurations, an optical transmitter and an optical receiver, the transmitter and the receiver being arranged next to one another. The two components are precisely aligned relative to each other by means of the positioning and adjustment configurations such that the first mirror can cooperate with the optical receiver and the second mirror with the optical transmitter, so that light coupled in via the optical waveguide falls on the receiver and light generated by the transmitter is coupled into the optical waveguide.

The assembly according to the invention as well as the components according to the invention which make up the assembly, offer a series of advantages. The use of a first and a second mirror in a way interleaved, i.e. in the nature of a double mirror, makes it possible to use one and the same optical waveguide for transmission of light signals directed to the receiver and of light signals generated by the transmitter. The first mirror, which preferably has a much larger surface area than the second mirror, reflects the light which exits the optical waveguide, towards the receiver. This is done with a very high efficiency, because only a very small part of the incoming light falls on the second mirror and, thus, can not be reflected towards the receiver. Vice versa, almost the whole light that is radiated from the transmitter, is reflected by the second mirror towards the optical waveguide and is coupled into it at that place, because only a very small part of the generated light is not reflected onto the end face of the optical wave guide.

Preferably, the area of the second mirror projected into a plane perpendicular to the longitudinal axis of the optical waveguide amounts to not more than $1/10$ of the projected area of the first mirror. It is in this way that the loss of the light signals directed to the receiver can be kept to a very low level.

It is further provided for that the second mirror, in a projection into a plane perpendicular to the longitudinal axis of the optical waveguide, lies within the area of the first mirror. This design likewise serves to reduce the losses, because those surface regions are minimized which can not be utilized for transmission of light.

Preferably, it is further provided for that the first and second mirrors are parabolic mirrors. Such design results in lower losses as, for instance, plane mirrors.

According to the preferred embodiment of the invention it is provided for that the focal point of the second mirror, as seen from the optical waveguide, lies behind the focal point of the first mirror. The respective focal points are coordinated with the arrangement of the transmitter and the receiver in such a way that there is an optimum transmission.

According to the preferred embodiment it is further provided for that the component which incorporates the optical waveguide is provided with a receiving groove, having a trapezoidal cross-section, for an optical fiber, and in that the optical waveguide is an optical fiber which has a trapezoidal cross-section in the region of the component. An optical fiber having a trapezoidal cross-section can be connected with the component in a much more easy and reliable way than an optical fiber with circular cross-section. Moreover, there are only very small transmission losses.

According to the preferred embodiment it is further provided for that the receiver is provided on its active surface with a filter, which is opaque for the light radiated from the transmitter. Thus, any stray light that is not coupled in from the transmitter into the optical waveguide, but falls on the receiver, does not lead to an interference of the signal transmission, because the stray light is absorbed by the filter.

On the component equipped with the transmitter and the receiver, there are preferably provided conducting tracks for connecting the transmitter and the receiver. Such conducting tracks may, in particular, be constituted by a gold coating which forms a bondable surface. The gold coating can be applied in a simple way by galvanic deposition.

A copper layer is preferably provided underneath the gold layer, this copper layer serving for carrying off the heat loss generated by the transmitter and the receiver. To this end, the copper layer is realized with a comparably large thickness.

A separation layer made of nickel is preferably applied between the gold coating and the copper layer, which separation layer prevents any diffusion of atoms of the gold coating into the copper layer. Preferably, there is further provided on the substrate of the component a starter layer made of nickel, the copper layer being able of being galvanically deposited onto this starter layer.

The assembly can be produced by a method according to the invention which comprises the following steps: At first, by taking the shape of a negative mold, there is produced a substrate having positioning configurations and at least two mirror surfaces as well as a further substrate having adjustment configurations and at least one receptacle for an optoelectronic component. Subsequently, the two substrates are metallized in a suitable way, the metallization of the mirror surfaces serving for providing a well-reflecting double mirror, whereas the metallization of the substrate, which is provided with the receptacles for the optoelectronic component, serves for connection of these components and also for carrying off the heat loss generated by them. Then, at least one optical transmitter and at least one optical receiver are mounted on the substrate provided with the receptacle. Following this, the two substrates are placed one upon the other, they being precisely aligned relative to each other by means of the adjustment and positioning configurations. Finally, the two substrates are secured to each other.

This method makes it possible to produce the two components, which finally will make up the assembly, separate from each other. It is in this way that there can be achieved a low waste rate, because a functional check can be carried out after each intermediate step. If it happens that the component does not work, only this component has to be discarded and not the entire assembly. The two substrates may be produced by means of injection molding technique, for example. In this way, there can be obtained by formation the microstructured surface of the later components with the required high accuracy along with low production costs. The two mirrors and the transmitter as well as the receiver need not to be coordinated with each other on assembly in an expensive way, as is partly required for each individual component in prior art. Rather, an optimum constructional arrangement and alignment relative to each other is defined, which with each formed component automatically occurs due to the adjustment and positioning configurations.

According to a preferred embodiment of the method according to the invention, each substrate comprises a multitude of mirror surfaces and receptacles, respectively, the individual assemblies being subsequently severed from the two superimposed and bonded substrates. Similar to chip production, there can be produced a substrate which has a very large number of corresponding configurations. As a last production step, the substrate is sliced or cut up into a multitude of individual components, so that there are low piece costs on production.

BRIEF DESCRIPTION OF THE DRAWINGS

In the following, the invention will be described with reference to a preferred embodiment which i illustrated in the attached drawings; In the drawings:

FIG. 1 shows in a schematic cross-section an assembly according to the invention, FIG. 4 shows in a schematic top view a first component of the assembly according to the invention, FIG. 5 shows a section along the plane V-V of FIG. 4, FIG. 6 shows a section along the plane VI-VI of FIG. 4.

DETAILED DESCRIPTION

Figure 3:
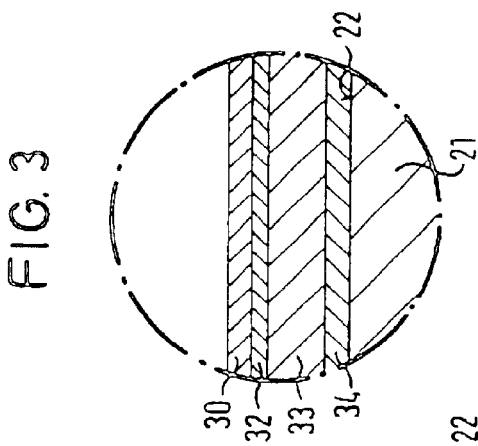
FIG. 3 shows on a still enlarged scale a detail of FIG. 2.

In FIG. 1 there is shown in cross-section an assembly according to the invention. It consists of a first component 10 and a second component 20.

The first component 10 (see also FIGS. 4 to 6) consists of a substrate 11 that can be produced by an injection molding method. Formed on the surface 12 of the first component is a receiving groove 13 for an optical waveguide. The receiving groove 13 has a trapezoidal cross-section (see in particular FIG. 5) and extends starting from an end face of the component. The receiving groove 13 is followed by a first mirror 14. The latter is configured as a parabolic mirror and is arranged such that it reflects light, that arrives at it from an optical waveguide arranged in the receiving groove 13, approximately perpendicularly to the surface 12 away from the first component. The first mirror 14 is followed by a second mirror 15 which likewise is configured as a parabolic mirror. The second mirror is designed such that it reflects light, that arrives at it in a direction which is approximately perpendicular to the surface 12, towards an optical waveguide arranged in the receiving groove 13. The second mirror 15 lies behind the first mirror 14, as seen from an optical waveguide arranged in the receiving groove 13. If the first and second mirrors are projected into a plane perpendicular to the longitudinal axis of an optical waveguide received in the receiving groove 13 (see illustration in FIG. 5), then the second mirror 15 lies within the outline defined by the first mirror. In other words, the first mirror 14 has a recess, behind which the second mirror 15 is arranged. The projected area of the second mirror is much smaller than the projected area of the first mirror (see also FIG. 5) and amounts to less than 1/10 of the area of the first mirror.

Provided on the surface 12 of the component 10 are positioning configurations 16 which are configured as depressions in the shape of truncated pyramids. The first component is metallized at least in the area of the two mirrors 14, 15, so that a reflecting surface is formed there.

Inserted in the receiving groove 13 is an optical waveguide 17 (see FIG. 1), which at its end inserted in the first component 10 has a trapezoidal cross-section, so that it precisely fits in the receiving groove. It is possible to produce the trapezoidal cross-section at the end of the optical waveguide, for example, in that a conventional POF optical waveguide having a circular cross-section is inserted in a receptacle with trapezoidal cross-section, is heatened to its softening temperature and is then pressed into the receiving groove by means of a pressing tool, so that it assumes the shape thereof. The optical fiber 17 is pushed into the receiving groove 13 so far that its end face 18 lies immediately in front of the first mirror 14. In this position it can be fixed in place by any suitable adhesive. With an optical fiber having a diameter of 1000 $\mu$m in the non-deformed cross-section, the receiving groove 13 may have, for example, a height h1 of 800 $\mu$m and a width d1 in the region of the surface 12 of 1200 $\mu$m. These dimensions also correspond to the dimensions of the parabolic mirror 14 at the transition to the receiving groove 13. The width d2 of the second parabolic mirror 15 at the surface 12 and the transition to the first parabolic mirror 14 can be in the range of 250 $\mu$m.

According to a variant not illustrated in the Figures, an optical fiber having a semicircular cross-section may be used, too, which is inserted in the receiving groove with a likewise semicircular cross-section. For geometric reasons, such cross-section of the optical fiber in combination with the parabolic mirror results in a better efficiency on the coupling in of light into the optical fiber.

Figure 7:
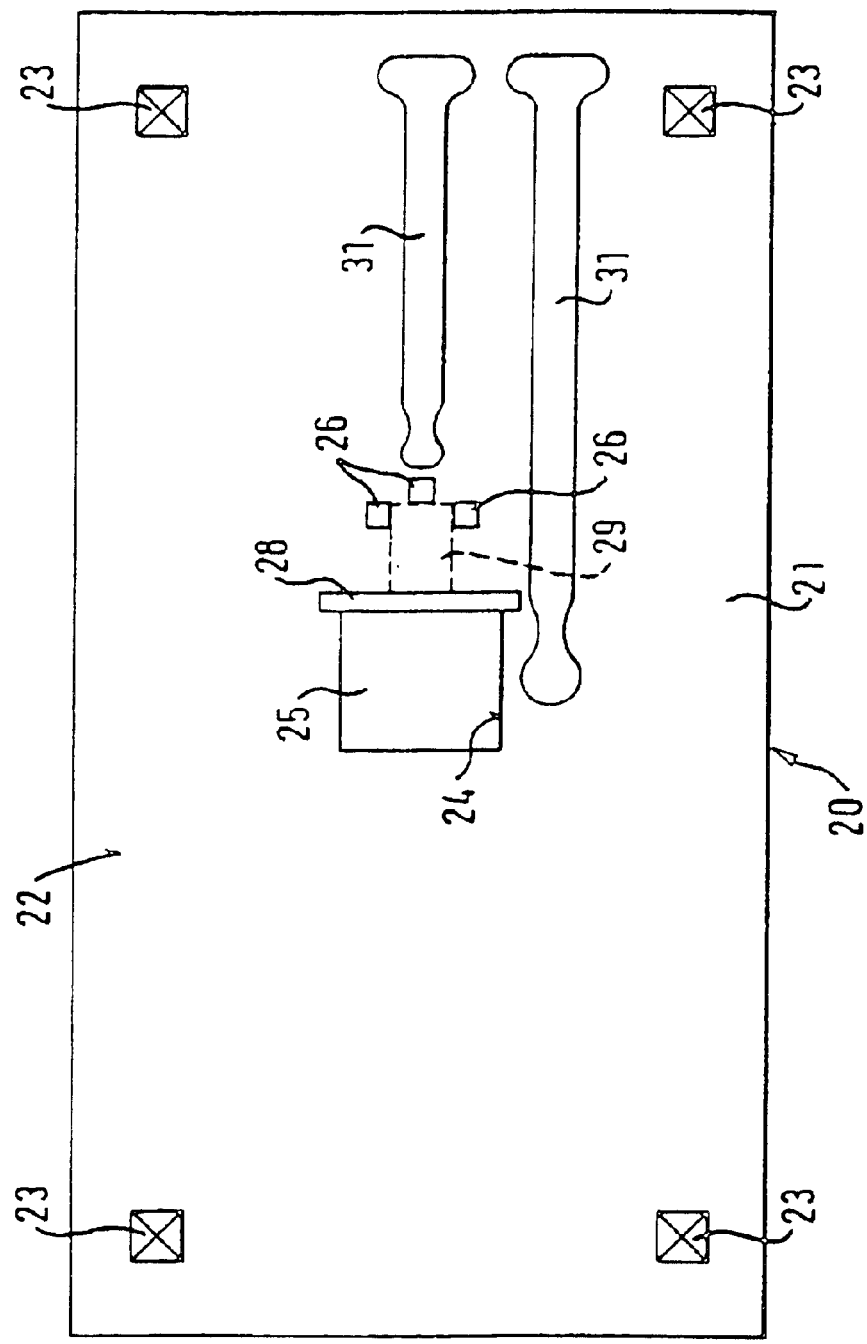
FIG. 7 shows in a schematic top view a second component of the assembly according to the invention.
Figure 8:
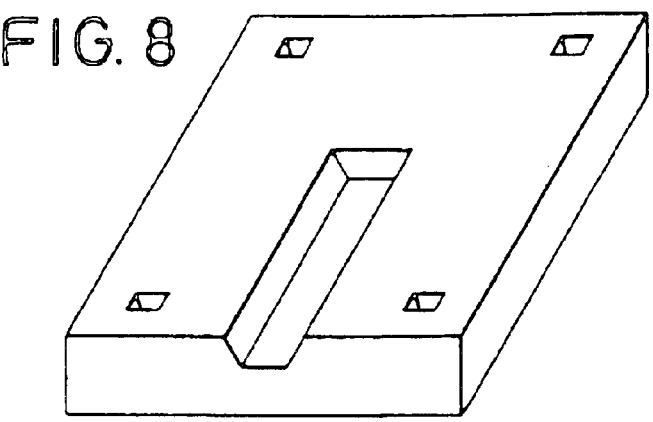
FIGS. 8 to 12 show various intermediate states during production of the component of FIG. 4.
Figure 9:
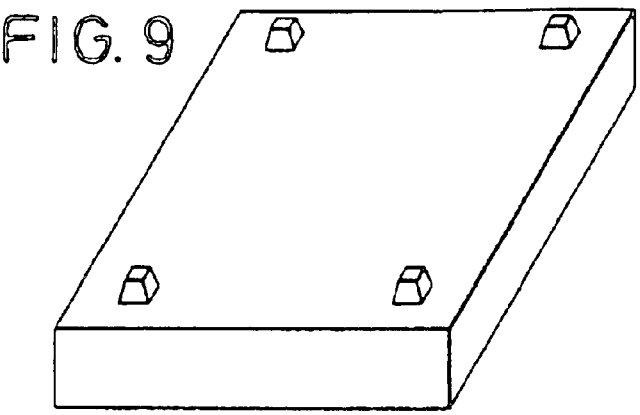
Figure 10:
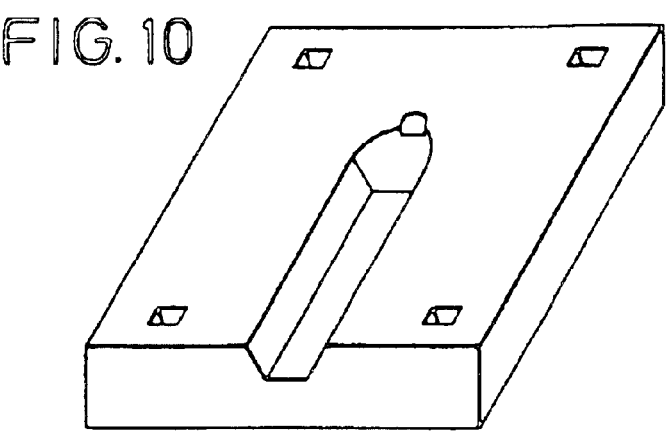
Figure 11:
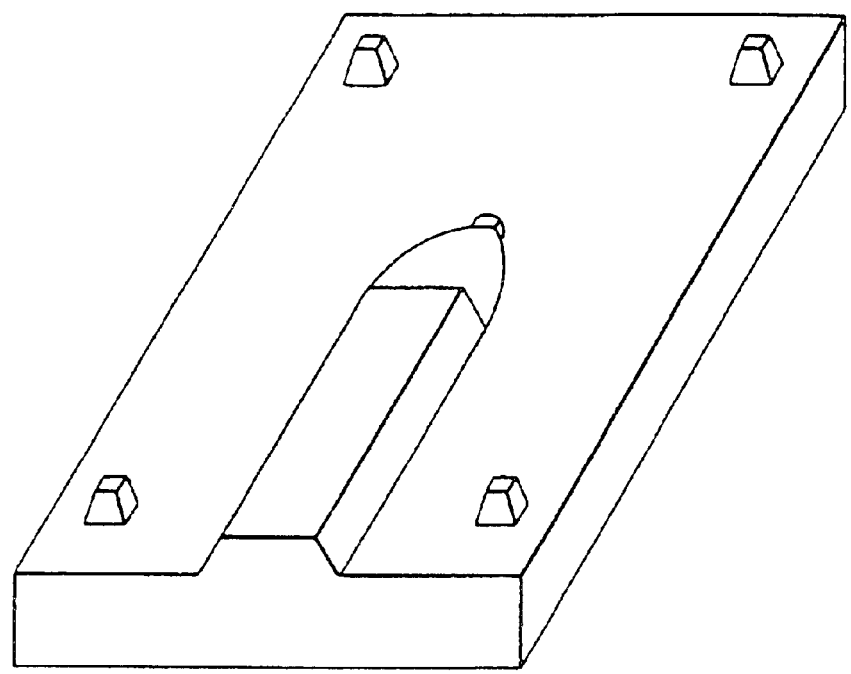
Figure 12:
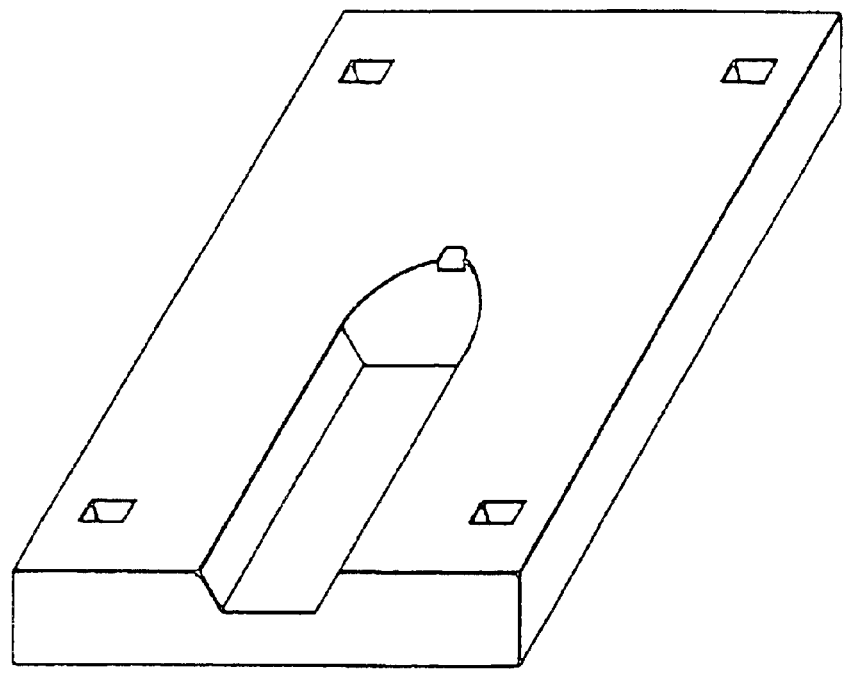

The second component 20 (see also FIG. 7) comprises a substrate 21 which likewise may be produced by an injection molding method. Provided on a surface 22 of the second component are several adjustment configurations 23, which are configured as pyramid-shaped raised portions. These are adapted to the positioning configurations 16 of the first component.

On the side of its surface 22, the second component is provided with two receptacles for optoelectronic components. One of the receptacles is configured as a depression 24 and serves for receiving an optoelectronic receiver, for instance a photodiode 25. The other receptacle consists of pyramid-shaped protrusions 26 and a web 28, which together serve as a receptacle for an optoelectronic transmitter 29 (indicated in broken lines in FIG. 7), for instance for a laser diode.

Provided on the surface 22 is a gold coating 30 (see FIG. 3), by means of which conducting tracks 31 (schematically indicated in FIG. 7) are formed for connecting the optoelectronic receiver 25 and the optoelectronic transmitter 29. The gold coating 30 is formed on a copper layer 33, using a nickel separation layer 32. This copper layer 33 has a comparably large thickness, for instance 30 $\mu$m, and serves for carrying off the heat loss of the optoelectronic components 25, 29. The separation layer 32 prevents any diffusion of atoms of the gold coating 30 into the copper layer 33. The copper layer 33, in turn, is applied to a nickel starter layer 34, for instance by galvanic deposition. The nickel starter layer has been chemically deposited after doping the substrate 21 in a palladium solution.

The described structure of the coating of the substrate 21 may also be used with regard to the substrate 11.

Figure 2:
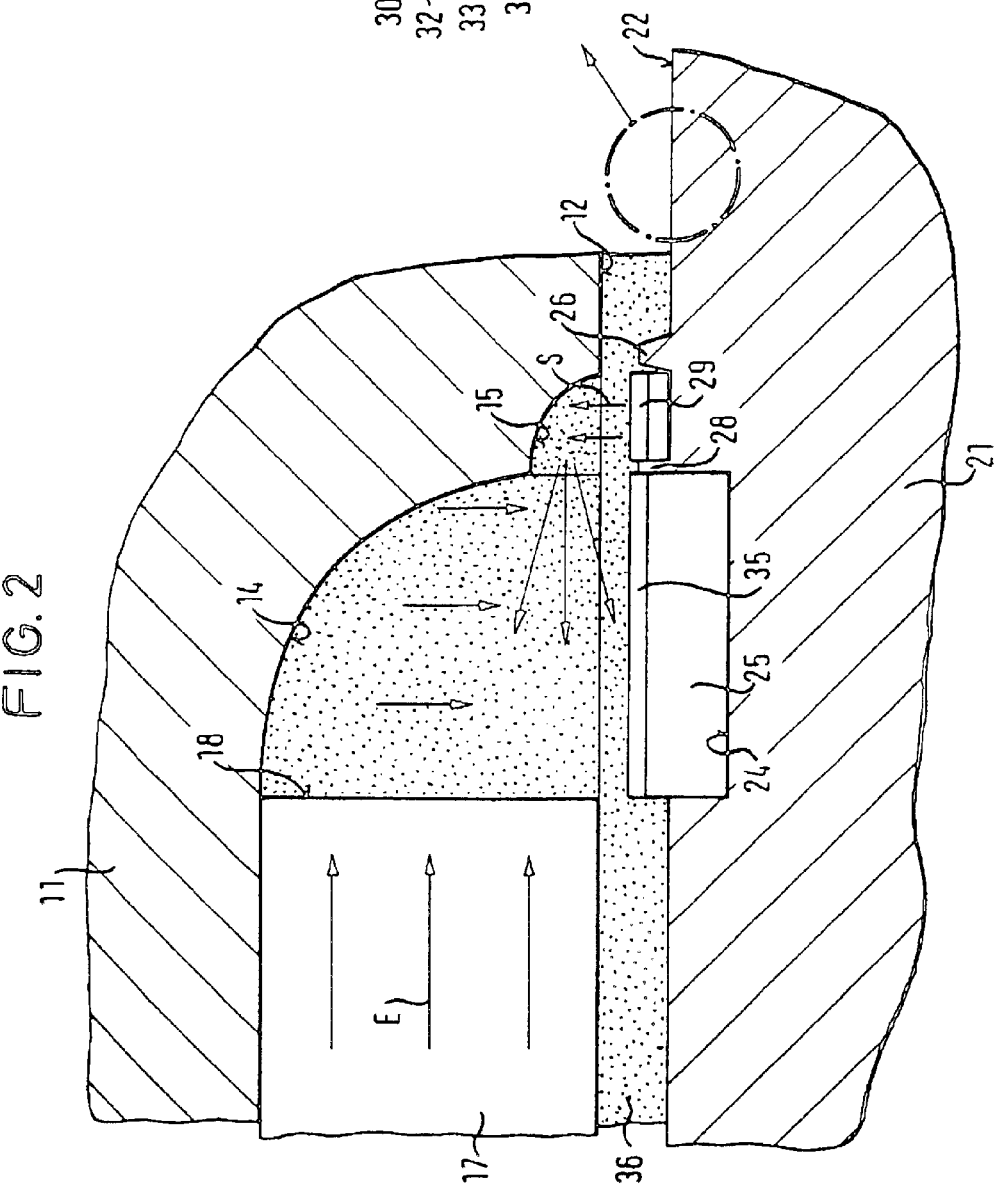
FIG. 2 shows on an enlarged scale a detail of the assembly of FIG. 1.

When provided with the optical fiber and the optoelectronic components, respectively, the two components 10, 20 are placed one upon the other such that the adjustment configurations 23 of the second component engage in the positioning configurations 16 of the first component. In this way the two components are aligned relative to each other such that the optoelectric receiver 25 is suitably aligned relative to the first mirror 14 and the optoelectronic transmitter 29 is suitably aligned relative to the second mirror 15. Light E (see FIG. 2) coming in via the optical waveguide 17 is reflected by the first parabolic mirror 14 such that it hits the optoelectronic receiver 25. The amount of incident light that hits the second mirror 15 and, consequently, cannot be reflected to the receiver 25, results in small losses only, because the mirror 15 takes up only a small part of the area of mirror 14. Light S that is generated by the optoelectric transmitter 29, however, is reflected by the second parabolic mirror 15 toward the end face 18 of the optical waveguide 17 and is coupled into it there. The portion that falls as stray loss on the receiver 25 results only to small losses with a suitable geometry of the mirror. Further, a filter 35 is applied to the receiver 25, which filter may consist of a lacquer layer with a color that is adapted to the color of the light S of the transmitter. Consequently, the filter 35 is opaque for the light S generated by the transmitter, so that the stray losses do not generate any signal of the receiver 25.

The two components 10, 20 are bonded to each other by means of an optically transparent adhesive, the refraction index of which is adapted to the refraction index of the optical fiber 17. In so doing, the adhesive 36 fills any cavity between the two components 10, 20, so that an optimum transmission of light is guaranteed.

Some steps of the method of producing the substrate 11 will be described now by means of the FIGS. 8 to 12. First, a master piece of silicon (see FIG. 8) is produced, which already has depressions that correspond to the positioning configurations on the substrate which are in the shape of a truncated pyramid. Then, the silicon master piece serves to form a nickel piece of the first generation (see FIG. 9). The nickel piece of the first generation, in turn, serves to form a nickel piece of the second generation. Next, a groove is produced in this nickel piece, which corresponds to the later receiving groove for the optical waveguide, and areas that correspond to the later mirror surfaces 14, 15 (illustrated in FIG. 10). The groove and the surfaces can be machined, for example, with a high precision micro milling cutter. Subsequently, the nickel piece of the second generation for its part serves for forming, so that a nickel piece of the third generation is produced (illustrated in FIG. 11). This piece represents a negative mold of the substrate 11 to be produced, from which may be taken the shape by injection molding, for example.

An analogue procedure may be selected with regard to the second substrate 21.

With this procedure there results the advantage that all those geometries and designs that are to be obtained with particularly high precision and are expensive therefore, have to be produced only one single time, i.e. either on the silicon master piece (recess for the receiving groove as well as recesses for the positioning configurations) or on the nickel piece of the second generation (surfaces for the mirrors). The nickel piece of the third generation may then be used to form these highly precise configurations in large numbers, for example by injection molding.

What is claimed is:

1. An optoelectronic assembly of a first component comprising positioning configurations and a second component comprising adjustment configurations, wherein the first component comprises an optical waveguide, a first mirror and a second mirror which takes up a much smaller area than the first mirror, the first mirror lying in prolongation of the optical waveguide, wherein the second mirror lies also in prolongation of the optical waveguide, the second mirror, as seen from the optical waveguide, lies behind the first mirror and the first mirror is followed by the second mirror, and the second component comprises an optical transmitter and an optical receiver, the transmitter and the receiver being arranged next to one another and the two components being precisely aligned relative to each other by means of the positioning and adjustment configurations such that the first mirror can cooperate with the optical receiver and the second mirror with the optical transmitter, so that light (E) coupled in via the optical waveguide falls on the receiver and the light (S) generated by the transmitter is coupled into the optical waveguide.

2. The component according to claim 1, wherein the area of the second mirror projected into a plane perpendicular to the longitudinal axis of the optical waveguide amounts to not more than 1/10 of the projected area of the first mirror.

3. The component according to claim 1, wherein the second mirror, in a projection into a plane perpendicular to the longitudinal axis of the optical waveguide, lies within the area of the first mirror.

4. The component according to claim 1, wherein the first and second mirrors are parabolic mirrors.

5. The component according to claim 1, wherein the focal point of the second mirror, as seen from the optical waveguide, lies behind the focal point of the first mirror.

6. The component according to claim 1, wherein the first component is provided with a receiving groove, having a trapezoidal cross-section, for an optical waveguide and in that the optical waveguide is an optical fiber which has a trapezoidal cross-section in the region of the component.

7. The component according to claim 1, wherein the first component is provided with a receiving groove, having a semicircular cross-section, for an optical waveguide and in that the optical waveguide is an optical fiber, which has a semicircular cross-section in the region of the component.

8. The assembly according to claim 1, wherein the receiver is provided on its active surface with a filter, which is opaque for the light radiated from the transmitter.

9. The assembly according to claim 1, wherein conducting tracks are provided by means of which the receiver and the transmitter can be connected.

10. The assembly according to claim 1, wherein the second component comprises a gold coating on its outer surface, which coating forms a bondable surface.

11. The assembly according to claim 8, wherein conducting tracks are provided by means of which the receiver and the transmitter can be connected.

12. The assembly according to claim 8, wherein the second component comprises a gold coating on its outer surface, which coating forms a bondable surface.

13. The assembly according to claim 9, wherein the second component comprises a gold coating on its outer surface, which coating forms a bondable surface.

* * * * *